(12) United States Patent
Etkin et al.

(10) Patent No.: US 8,279,896 B2
(45) Date of Patent: Oct. 2, 2012

(54) SYNCHRONIZATION IN A WIRELESS NODE

(75) Inventors: Raul Hernan Etkin, San Francisco, CA (US); Jung Gun Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 12/715,761

(22) Filed: Mar. 2, 2010

(65) Prior Publication Data

US 2011/0216658 A1 Sep. 8, 2011

(51) Int. Cl.
*H04J 3/06* (2006.01)
*H04L 7/00* (2006.01)
(52) U.S. Cl. .................................. 370/503; 375/356
(58) Field of Classification Search .................. None
See application file for complete search history.

(56) References Cited

U.S. PATENT DOCUMENTS

2009/0006882 A1* 1/2009 Manapragada et al. ...... 713/600
2009/0290572 A1* 11/2009 Gonia et al. .................. 370/350

OTHER PUBLICATIONS

Basharat, et al. "A Framework for Intelligent Sensor Network with Video Camera for Structural Health Monitoring of Bridges." Proceedings of the 3rd International Conference on Pervasive Computing and Communications Workshops. Retrieved on Jan. 8, 2010 from IEEE Xplore.
Arms, et al. "Energy Harvesting Wireless Sensors and Networked Timing Synchronization for Aircraft Structural Health Monitoring." MicroStrain Inc., Williston, VT; Rotary Wing/Patrol Aircraft Branch, U.S. Navy/NAVAIR, Naval Air Systems Command, Lexington Park, MD, 2009.

* cited by examiner

*Primary Examiner* — Clemence Han

(57) ABSTRACT

A wireless node clock is periodically synchronized with a wireless access point clock. The wireless access point clock is globally synchronized with other access points in a network. Failure of the access point is detected. A search is performed for a beacon signal of a neighboring wireless access point that is associated with the network. The neighboring access point also has a globally synchronized clock. The wireless node clock is synchronized with the globally synchronized clock of the neighboring wireless access point.

20 Claims, 5 Drawing Sheets

SYNCHRONIZATION IN A WIRELESS NODE

BACKGROUND

Many monitoring and/or sensing applications use deployed sensors to collect sensory data (e.g., temperature, light, movement, etc.). In certain situations, collection of sensory data from different sensors is coordinated (e.g., in time, distance, quantity, etc.).

In some wireless networks, access points periodically broadcast information to wireless nodes within the access point's cell and/or cluster area. Broadcast information can include timing information.

BRIEF DESCRIPTION OF DRAWINGS

The following description includes discussion of figures having illustrations given by way of example of implementations of embodiments of the invention.

DETAILED DESCRIPTION

Figure 1:
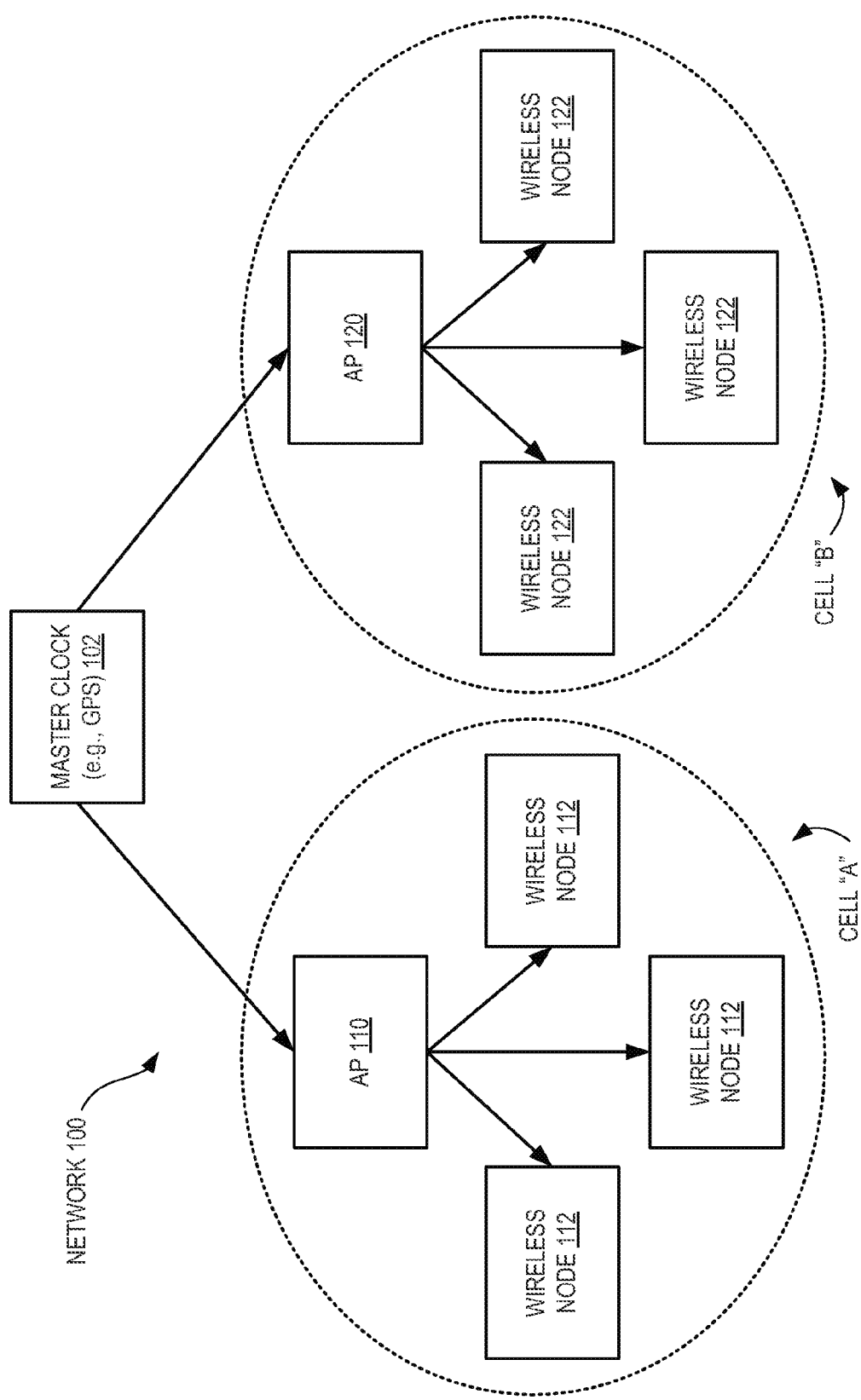
FIG. 1 is a block diagram illustrating a system according to various embodiments.

Many wireless applications, including certain monitoring and sensing applications, seek to have accurate synchronization among wireless nodes. One example is seismic oil exploration, in which high synchronization accuracy is sought among all sensor nodes in the survey field. The higher the accuracy, the better the quality of the sensed data. Given that many wireless sensor nodes are limited in terms of power, size and manufacturing cost, equipping every node with an accurate timing source, such as a GPS (Global Positioning System) clock or an atomic clock, is not practical in many cases.

Network timing protocols, such as Network Time Protocol (NTP) and IEEE Precise Time Protocol (PTP) are designed to operate in a cable-based local area network (LAN) where transmission delays are more predictable than in wireless settings. These protocols allow timing information to be communicated via time-stamped message transmissions. While it is possible to use these protocols in wireless LANs to synchronize local nodes to a master clock (e.g., located on an access point), the achievable timing accuracy is highly dependent on the wireless channel conditions and network traffic.

Based on the IEEE 802.11 standard, each 802.11 device has a time synchronization function (TSF) counter, which can be used for time synchronization among nodes in the same cell. Each 802.11 access point (AP) periodically transmits Beacon frames (or Beacon signals or simply Beacons), which announce the presence of the wireless LAN (WLAN) network. The Beacon frames include a timestamp of the AP's TSF counter to synchronize the TSF counters of other nodes in the cell or BSS (Basic Service Set). TSF timestamps are written to the Beacon frames at the time they are sent on the physical medium, compensating for internal hardware delays (e.g., in an 802.11 chipset) and without being affected by medium access control (MAC) delays. A receiving node accepts the timing information in Beacon frames sent from the AP servicing the node's BSS. If the receiving node's TSF counter is different from the timestamp in the received Beacon frame, the receiving node sets its local TSF counter to the received timestamp value.

While embodiments described herein are not limited to wireless nodes without integrated GPS timing sources and/or direct node to node communication capabilities, various embodiments described herein leverage 802.11 TSF timestamps to achieve synchronization of an entire wireless sensor network (i.e., synchronization of nodes across different cells) to a master clock using AP-to-node communication without the use of GPS timing sources on the nodes to achieve synchronization.

The described synchronization allows sensor nodes to set accurate timestamps on sensed data and/or sample sensory data at a proper sampling frequency. Other wireless protocols having similar timing synchronization functionality could also be used in place of 802.11 in different embodiments.

In particular, failure of an access point to transmit Beacon frames (e.g., with timing information) can be catastrophic for a sensor network given that failure of the access point can cause an entire cluster of sensors to lose timing synchronization with the network. In situations where timing synchronization is critical, lack of synchronization can render sensor data from unsynchronized sensors useless. There exist a variety of reasons and factors that could cause an access point to fail including, but not limited to, power loss, weather conditions, damage, etc.

In addition to leveraging TSF timestamps to achieve synchronization, various embodiments leverage neighboring access points to provide backup synchronization in cases where a primary access point fails.

FIG. 1 is a block diagram illustrating a system according to various embodiments. Network 100 includes nodes 112 associated with AP 110 and nodes 122 associated with AP 120. Master clock 102 can be considered part of network 100 or it can be external to network 100. For clarity of discussion, only two cells (A and B) are illustrated; more cells could be used.

AP 110 and AP 120 are synchronized to master clock 102. Master clock 102 could be a GPS clock or other suitable global clock. In various embodiments, AP 110 and 120 are synchronized using 802.11 TSF timestamps. IEEE 802.11 is an example of a wireless protocol having a timing synchronization function that can be used to generate synchronizing timestamps. In alternate embodiments, other protocols having a timing synchronization function could be used to generate similar synchronizing timestamps.

AP 110 and AP 120 each send out periodic Beacon frames with TSF timestamps. In various embodiments, the Beacon frames are transmitted with a higher transmission power than that used for transmitting regular data frames. However, it is not necessary that the transmission power be different for Beacon frames. Wireless nodes 112 and 122 detect the respective Beacon frames and synchronize their respective local counters according to the TSF timestamp in the Beacon frame. Given that the TSF counters in AP 110 and 120 are synchronized to master clock 102, the synchronization of nodes 112 and 122 to the TSF timestamps results in all of the nodes 112 and 122 having synchronized counter even though nodes 112 and nodes 122 belong to different cells in network 100.

In many WLANs, the APs transmit (e.g., broadcast) signals with a transmission power just high enough to ensure the signals reach all of the nodes serviced by the AP, referred to as the AP's cell or BSS (Basic Service Set). As shown in FIG. 1, nodes 112 belong to the cell or BSS of AP 110. Similarly, wireless nodes 122 belong to the cell or BSS of AP 120. In various embodiments, AP 110 and AP 120 broadcast Beacon frames with a transmission power higher than necessary to reach the nodes in each AP's respective cell area. Thus, nodes beyond each AP's cell area are able to detect and receive Beacon frames from a neighboring access point. In other words, if AP 110 were to fail, then at least a subset of wireless nodes 112 can detect Beacon frames from AP 120. The subset of wireless nodes 112 can then maintain synchronization with network 100 despite the failure of AP 110.

The example system shown in FIG. 1 is an example of a 2-layer system, with the access points represent one layer and the wireless nodes representing another layer. Other embodiments could be extended to include more layers. For example, if the APs are managed by another layer of a network via a few number of higher level access points and/or base stations, then each AP could be synchronized to a higher level AP using the same TSF timestamp approach. This hierarchical approach can be extended to as many layers as desired assuming timing errors remain within a specified range for the particular application.

Figure 2:
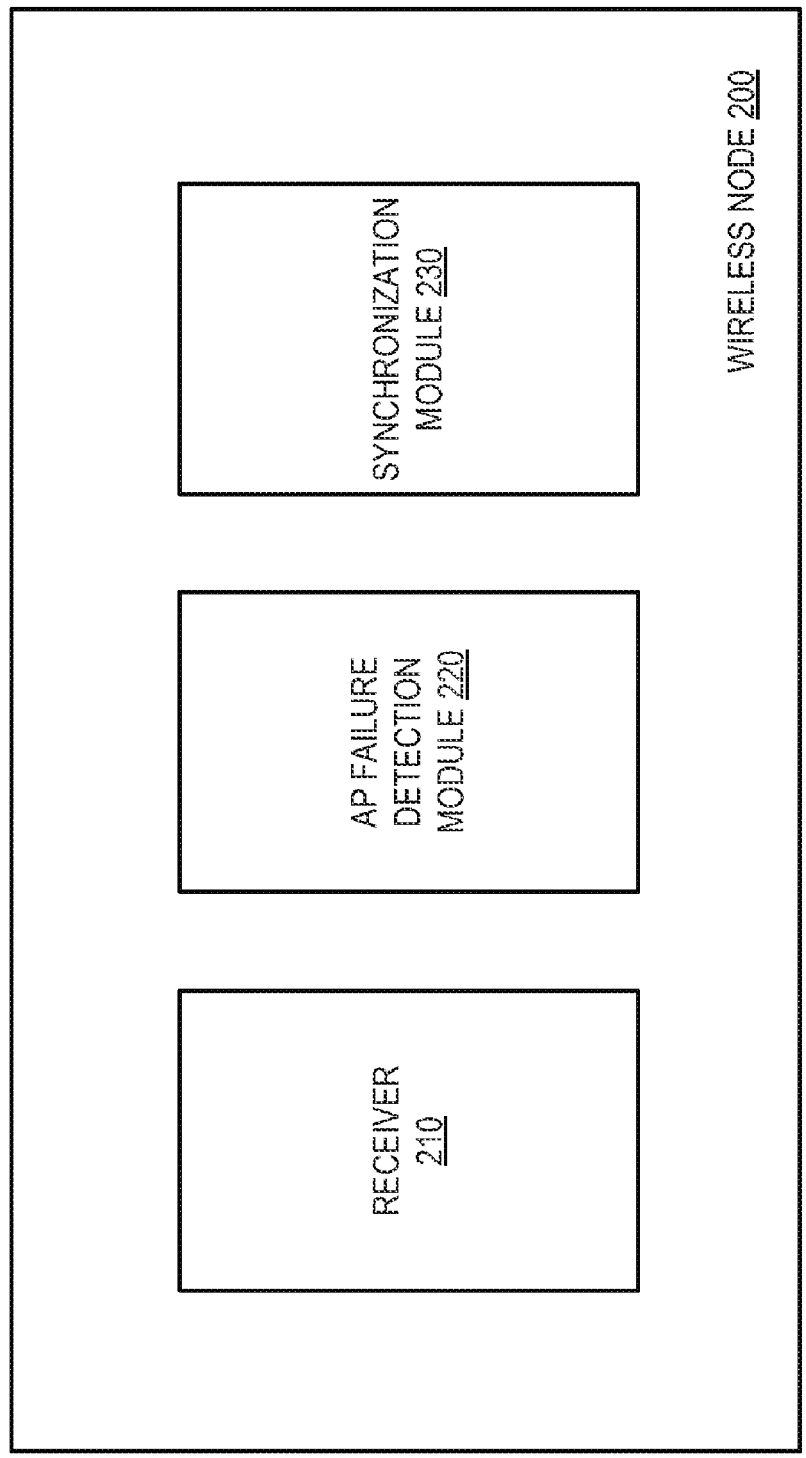
FIG. 2 is a block diagram illustrating a node according to various embodiments.

FIG. 2 is a block diagram of a wireless node according to various embodiments. Wireless node 200 includes a receiver 210 to receive clock synchronization signals from a wireless access point (AP) on a receiving channel. The receiving channel may be based on a particular transmission frequency, timing, wavelength, code or combination of these. The clock synchronization signals may include one or more timing synchronization function (TSF) timestamps. As discussed above, the TSF timestamp could be generated using the IEEE 802.11 protocol; however, other wireless protocols having timing synchronization functionality could also be used. The received TSF timestamp is synchronized to a global clock (e.g., GPS).

AP failure detection module 220 detects failure of a primary wireless AP. Failure may be detected by measuring a threshold level of missed Beacon frames. For example, if node 200 expects to receive a certain number of Beacon frames over a given time period, failure to receive one or more Beacon frames over that time period could constitute failure of the AP from the perspective of node 200. When AP failure detection module 220 detects a failure, it may send a signal to receiver 210 triggering it to change the receiving channel. Receiver 210 may then search for a Beacon signal from a neighboring AP. In various embodiments, node 200 includes stored information about channels for neighboring APs. In other words, receiver 210 uses known information (e.g., transmission frequency, timing, wavelength, etc.) about neighboring AP transmission channels to reduce the time needed to find a neighboring Beacon signal.

Synchronization module 230 synchronizes a clock on wireless node 200 with a neighboring wireless AP based on a detected Beacon signal from the neighboring AP. The clock could be an internal chipset clock (e.g., an 802.11 chipset clock) or it could be a slave clock controlled by an oscillator. The detected Beacon signal includes a TSF timestamp that is used to update a counter and/or a clock on node 200.

Figure 3:
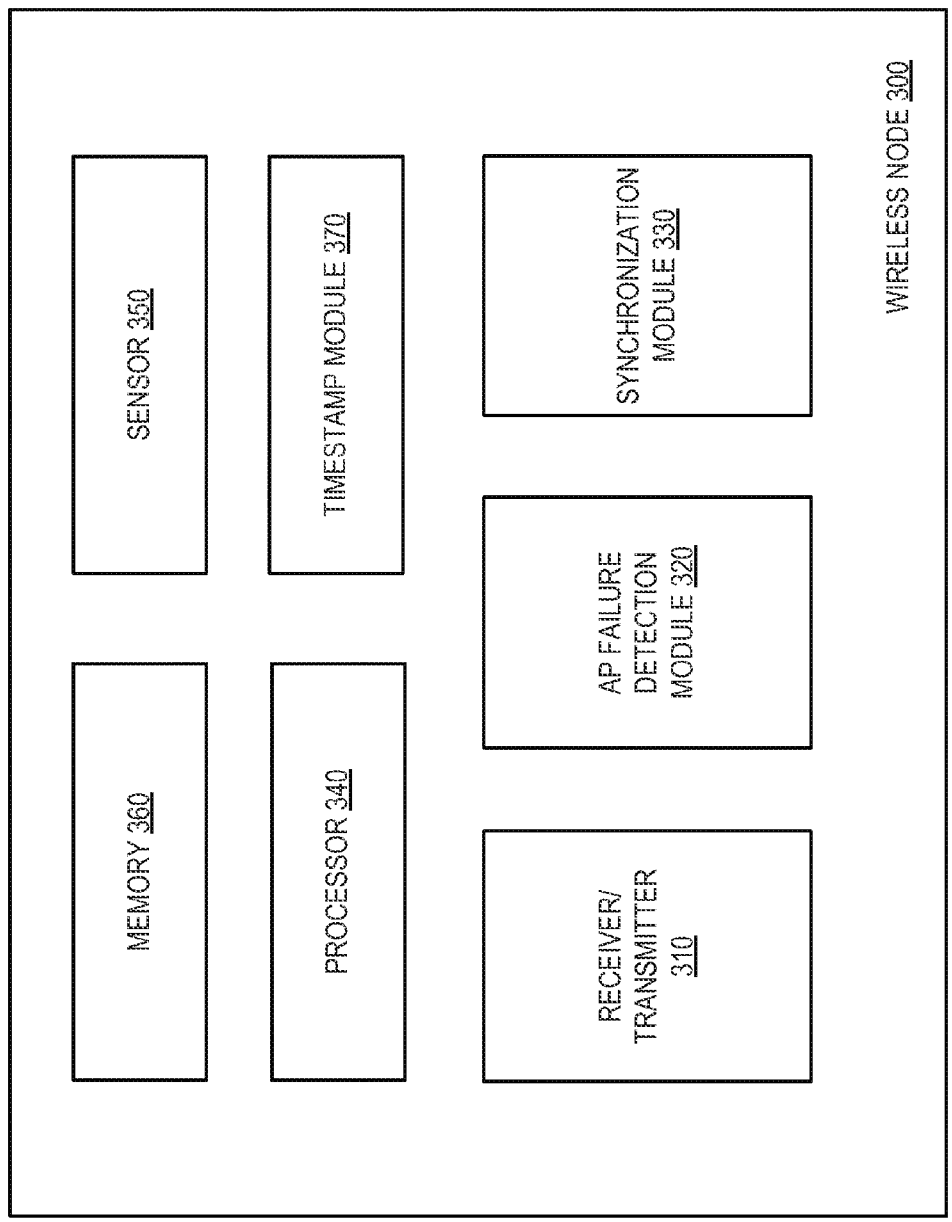
FIG. 3 is a block diagram illustrating a node according to various embodiments.

FIG. 3 is a block diagram illustrating a node according to various embodiments. Similar to node 200 of FIG. 2, node 300 includes a receiver 310, an AP detection failure module 320 and a synchronization module 330.

Receiver 310 receives a timing synchronization function (TSF) timestamp from a wireless access point in a network. The received TSF timestamp is synchronized to a global clock (e.g., GPS). In some embodiments, a local clock on node 300 may drift with respect to the global clock and a secondary clock (TSF disciplined oscillator, or TSFDO) may be used, whose frequency and phase may be adjusted by a control circuit. The TSF timestamp may be used to adjust the secondary clock to match the frequency and phase of the global clock as closely as possible. The secondary clock may be used as a timing reference for data sampling at the sensor 350 and/or time stamping of the sampled data. In some embodiments, the secondary clock may be implemented using a control loop and, for example, a voltage controlled crystal oscillator (VCXO), a voltage controlled temperature compensated crystal oscillator (VCTCX), or a digitally compensated crystal oscillator.

In alternate embodiments, node 300 may have a single clock which may drive the internal chipset and may be responsible for sampling sensor data for sensor 350. In some of these embodiments, this single clock may be a TSFDO which may be adjusted by the synchronization module 330 to match the frequency and phase of the global clock. In some embodiments with a single clock, the single clock may not be compensated by the synchronization module, and data time stamping may be done soon after the arrival of the TSF beacons to minimize the effects of clock drift.

Sensor 350 is used to collect sensory data such as, for example, seismic data (e.g., vibrations, etc.), temperature data, and/or other external sensory information. In various embodiments, the value of the sensory data is time dependent. Thus, sensory data may be tagged by timestamp module 370 with a globally accurate timestamp as described herein. In this way, time dependent sensory data is synchronized across an entire array of network sensors, including sensors that cross into different cells serviced by different access points.

Sensor 350 may sample data at a sampling frequency, which can be calibrated and/or synchronized to a slave clock and/or adjusted by synchronization module 330 (e.g., using TSF timestamps, as described herein).

Memory 360 can be used to store sensory data from sensor 350. In some embodiments, sensory data could be transmitted via transmitter 310 elsewhere for storage and/or processing. Memory 360 may also be used as a computer-readable storage medium containing instructions for synchronizing wireless node 300 as described herein. Such instructions can be executed by processor 340.

Alternate embodiments could be practiced without a synchronization module (e.g., synchronization modules 230, 330). Rather than synchronizing one or more local clocks on a wireless node, sensory data may simply be tagged with timing information (e.g., from TSF timestamps). Any timing errors in sampled sensory data can be corrected later based on the timing information tags. For example, sensory data could be tagged with a TSF timestamp and then sent to a data collection center for processing to compensate for any timing errors of a local clock on the node (e.g., node 300).

Figure 4:
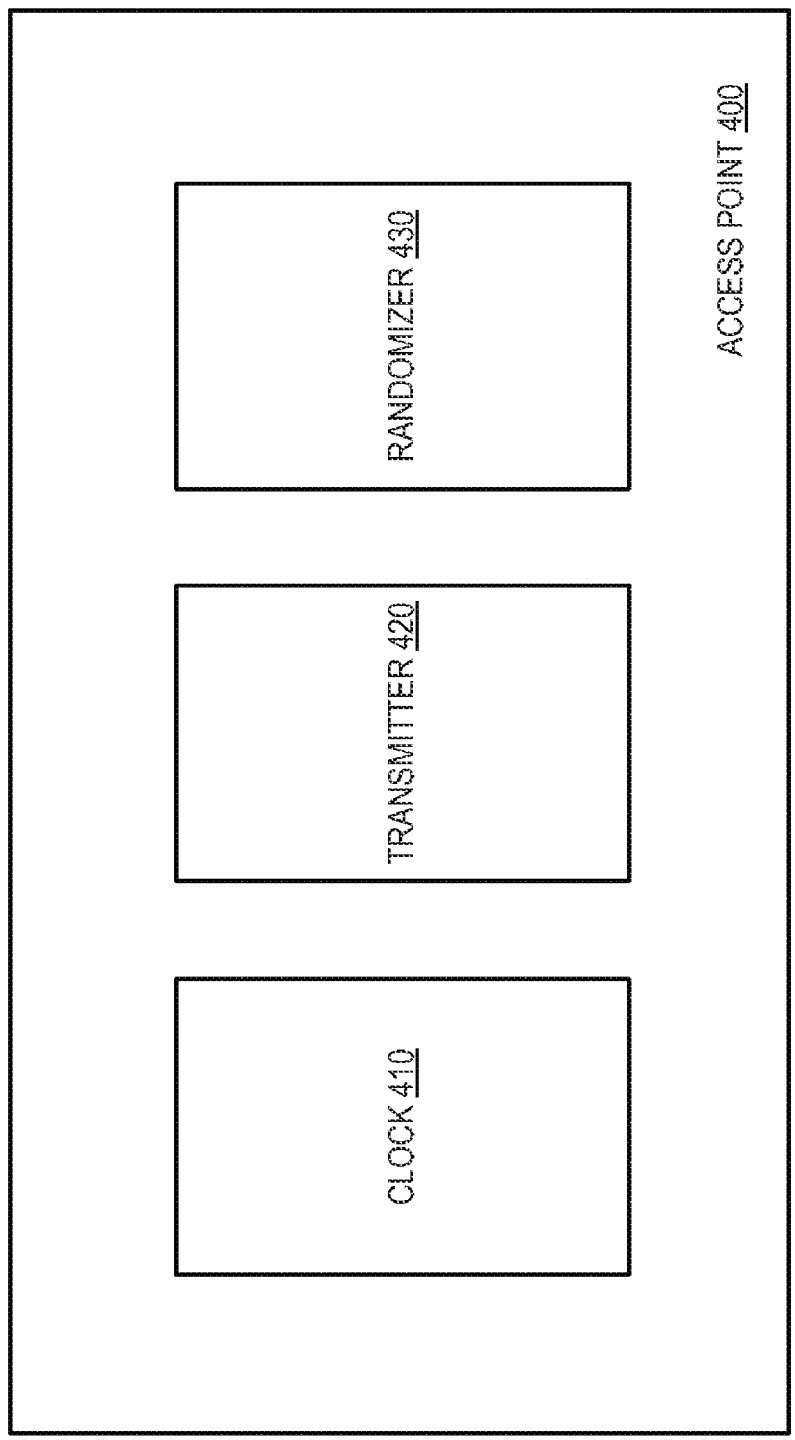
FIG. 4 is a block diagram illustrating a wireless access point according to various embodiments.

FIG. 4 is a block diagram illustrating a wireless access point according to various embodiments. AP 400 includes a clock 410 that is synchronized to other access points on a network. Clock 410 may be synchronized, for example, to a GPS clock, along with other APs in the network. Transmitter 420 transmits both packet data and Beacon frames. In various embodiments, transmitter 420 transmits Beacon frames with a transmission power that is greater than the transmission power used to transmit data channel data (e.g., packet data) and/or control channel data. Alternately described, transmitter 420 may transmit Beacon frames with a transmission power greater than necessary to reach all the nodes in the cell or BSS covered by AP 400.

Given that multiple APs on a network (e.g., AP 400) may be transmitting Beacon frames that reach nodes beyond a single AP's coverage area, nodes are susceptible to receiving multiple Beacon frames simultaneously. In other words, collisions may occur, for example, if two neighboring APs simultaneously transmit Beacon frames where each neighboring AP is the same distance away from the receiving node. In some embodiments, to prevent collisions, a randomizer 430 may be used, which randomizes times in which timing synchronization Beacons are sent. Randomizer 430 may be implemented as a hardware module, firmware, or as software stored on a computer-readable storage medium and executable by a processor on the AP. In alternate embodiments, other means to prevent collisions may be adopted, such as using different channels (frequency, time-slot, code) to transmit the beacons in neighboring APs.

Figure 5:
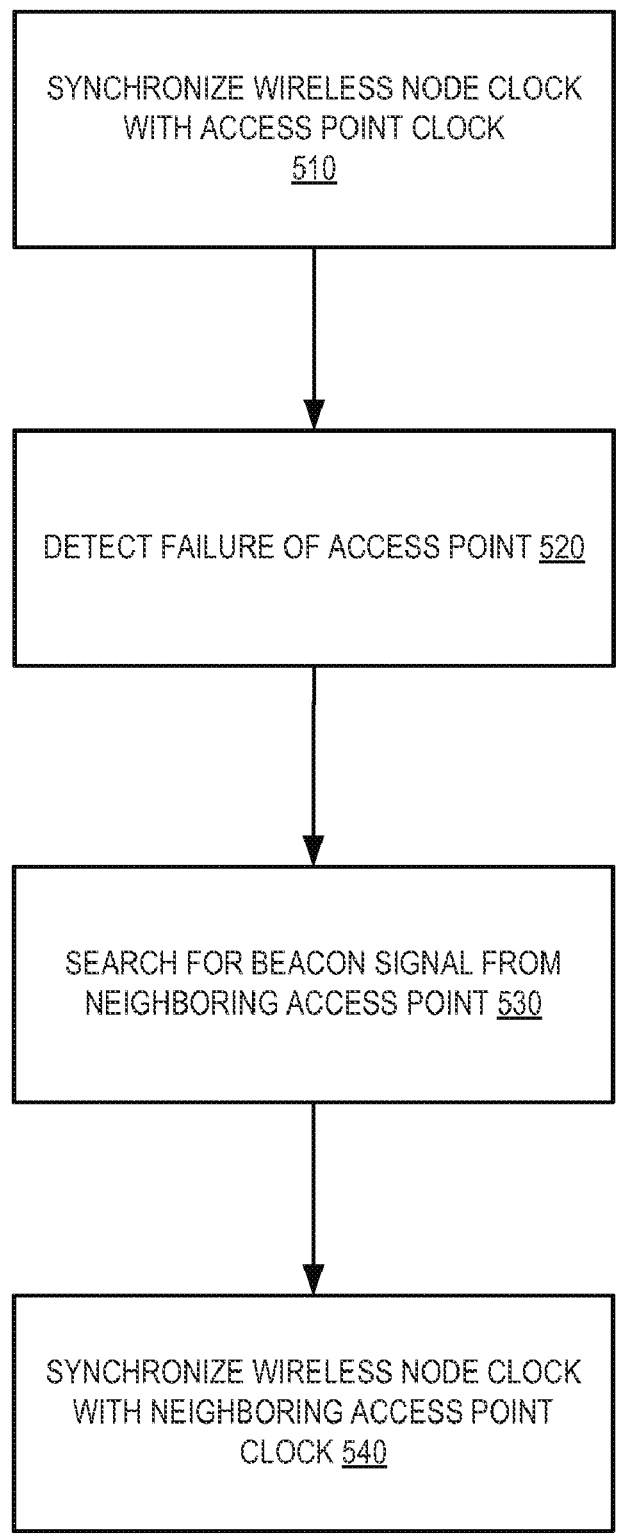
FIG. 5 is a flow diagram of operation in a system according to various embodiments.

FIG. 5 is a flow diagram of operation in a system according to various embodiments. The operations described with respect to FIG. 5 may be performed in a different order than shown; also, more operations or fewer operations might be performed in different embodiments. In general, the operations are performed on or at a wireless node belonging to a wireless network.

The wireless node synchronizes 510 a wireless node clock with an access point block. In various embodiments, this synchronization occurs through the use of time synchronization function (TSF) timestamps received by the wireless node from an access point. IEEE 802.11 is an example of a protocol that includes time synchronization functionality that can be leveraged to provide global timing information; other suitable wireless protocols could be used in different embodiments.

The wireless node detects 520 failure of the primary access point associated with the node. Failure may be detected by determining a number of expected Beacons over a time period and detecting failure of the access point when a threshold number of missed beacons are counted. In response to a detected AP failure, the wireless node searches 530 for a beacon signal of a neighboring wireless access point associated with the network. Neighboring APs have clocks that are globally synchronized on the network (e.g., via GPS). The searching for a neighboring beacon signal may include changing a receiver channel (e.g., in frequency, timing, wavelength, code, etc.). The wireless node may have information stored about neighboring APs (e.g., channel information) to reduce the search time.

When a neighboring AP has been detected, the wireless node synchronizes 540 the wireless node clock with a clock on the neighboring access point. In various embodiments, any synchronization context learned from previously synchronizing the wireless node with the primary AP is preserved. In other words, the wireless node's existing synchronization context may reduce the processing time and/or other burdens associated with updating synchronization using the beacon signal from the neighboring AP. The logic inherent in this approach is that the primary AP and the neighboring AP should be synchronized to the global clock for the network; therefore, the node's synchronization context learned from the primary AP should aid the node in updating its network timing synchronization via the neighboring AP. The node's synchronization context may also include information local to the node, such as temperature, drift of the local oscillator, etc. This local information may have been learned using the primary AP, and does not change when a new AP is used.

In embodiments where the wireless node includes a sensor for collecting sensory data, the wireless node may tag collected sensory data (e.g., with a timestamp). Sensory data may be tagged according to the synchronized wireless node clock or, in certain embodiments where there is no synchronized clock in the wireless node, sensory data may be tagged using timing information conveyed in the synchronization beacons. The timing information in the timestamp can be used in post-processing. Tagged data may be stored on the wireless node or it may be sent to a data collection center for processing and/or storage. If and when connectivity to the primary AP is restored, tagged data may be transmitted to the AP for storage.

The invention claimed is:

1. A method, comprising:
 periodically synchronizing a wireless node clock for a wireless node with a primary wireless access point clock, wherein the primary wireless access point clock is globally synchronized with other access points in a network;
 detecting a failure of the primary access point;
 searching for a beacon signal of a neighboring wireless access point associated with the network, the neighboring wireless access point having a globally synchronized clock; and
 synchronizing the node clock with the globally synchronized clock of the neighboring wireless access point.

2. The method of claim 1, further comprising:
 collecting sensor data; and
 applying a timestamp to the sensor data, wherein the timestamp is based, at least in part, on the synchronized wireless node clock.

3. The method of claim 2, further comprising:
 storing the time-stamped sensor data on the wireless node.

4. The method of claim 1, wherein detecting failure of the primary wireless access point comprises:
 detecting a failure to receive a predetermined number of beacon frames from the primary wireless access point.

5. The method of claim 1, wherein searching for a beacon signal of a neighboring wireless access point comprises:
 searching for a beacon signal on a different channel, wherein channels are differentiated based on one or more of signal frequency, time-slot, code.

6. The method of claim 1, wherein synchronizing the node clock with the globally synchronized clock of the neighboring wireless access point includes the node clock maintaining synchronization context learned from the primary wireless access point clock.

7. A wireless node, comprising:
 a receiver to wirelessly receive clock synchronization signals from a wireless access point (AP) on a receiving channel;
 an AP failure detection module to detect failure of a primary wireless AP;
 the receiver, in response to detecting failure of the primary wireless AP, to automatically change the receiving channel to receive clock synchronization signals from a neighboring wireless AP; and
 a synchronization module to synchronize a node clock with a neighboring wireless AP clock if failure of the primary wireless AP is detected.

8. The wireless node of claim 7, further comprising:
 a sensor to collect sensory data; and
 a timestamp module to apply a timestamp to the sensory data.

9. The wireless node of claim 8, further comprising:
 a memory to store the collected sensory data with corresponding timestamps received in the clock synchronization signals.

10. The wireless node of claim 9, the memory further to store synchronization context learned from the primary wireless AP.

11. The wireless node of claim 8, further comprising:
 a transmitter to send the collected sensory data to a data collection center.

12. The wireless node of claim 7, the receiver further to periodically change the receiving channel to determine whether the primary wireless AP has resumed functioning.

13. A wireless access point, comprising:
a clock synchronized to other access point clocks on a network; and
a transmitter to transmit timing synchronization beacons to one or more nodes that are outside a Basic Service Set (BSS) associated with the access point.

14. The wireless access point of claim 13, further comprising:
a randomizer to randomize times in which the timing synchronization beacons are sent.

15. The wireless access point of claim 13, wherein the timing synchronization beacons each include a time synchronization function (TSF) counter timestamp.

16. The wireless access point of claim 13, wherein the clock and the other access point clocks are synchronized to a global positioning system (GPS) clock.

17. The wireless access point of claim 13, the transmitter further to transmit Beacon frames with a transmission power greater than a transmission power used to transmit data channel data.

18. A method, comprising:
a wireless node detecting failure of a primary wireless access point having a first globally synchronized clock for a network;
searching for a beacon signal of a neighboring wireless access point associated with the network, the neighboring wireless access point having a second globally synchronized clock; and
receiving from the neighboring wireless access point a beacon having a wireless protocol time synchronization function (TSF) timestamp generated with reference to the second globally synchronized clock;
sampling sensory data on the wireless node; and
tagging the sensory data with the TSF timestamp, the tagged sensory data to be processed by an external entity based on the TSF timestamp to reflect synchronization with the first globally synchronized clock.

19. The method of claim 18, further comprising:
storing the tagged sensory data on the wireless node; and
uploading the tagged sensory data to the external entity upon request.

20. The method of claim 18, further comprising:
transmitting the tagged sensory data to the external entity, wherein the tagged sensory data is transmitted via the neighboring wireless access point if the primary wireless access point is in a failed state and the tagged sensory data is transmitted via the primary wireless access point if the primary wireless access point is in a functioning state.

* * * * *